US007890586B1

(12) United States Patent
McNamara et al.

(10) Patent No.: US 7,890,586 B1
(45) Date of Patent: Feb. 15, 2011

(54) MASS MULTIMEDIA MESSAGING

(75) Inventors: Justin McNamara, Atlanta, GA (US);
Anastasios L. Kefalas, Alpharetta, GA (US)

(73) Assignee: AT&T Mobility II LLC, Atlanta, GA (US)

(*) Notice: Subject to any disclaimer, the term of this patent is extended or adjusted under 35 U.S.C. 154(b) by 1210 days.

(21) Appl. No.: 10/994,518

(22) Filed: Nov. 23, 2004

Related U.S. Application Data

(63) Continuation-in-part of application No. 10/978,322, filed on Nov. 1, 2004, now Pat. No. 7,609,686.

(51) Int. Cl.
*G06F 15/16* (2006.01)
(52) U.S. Cl. ...................................... 709/206
(58) Field of Classification Search .................. 709/206
See application file for complete search history.

(56) References Cited

U.S. PATENT DOCUMENTS

| | | | | |
|---|---|---|---|---|
| 7,248,857 B1* | 7/2007 | Richardson et al. | .......... | 455/413 |
| 7,609,686 B1* | 10/2009 | McNamara et al. | .......... | 370/356 |
| 2003/0084177 A1* | 5/2003 | Mulligan | .................... | 709/230 |
| 2004/0082346 A1* | 4/2004 | Skytt et al. | ............... | 455/456.3 |
| 2005/0188041 A1* | 8/2005 | Kuriki et al. | ................ | 709/206 |
| 2005/0232267 A1* | 10/2005 | Mostafa | ...................... | 370/389 |
| 2005/0251848 A1* | 11/2005 | Al-Janabi | .................... | 725/135 |
| 2006/0003741 A1* | 1/2006 | Becker et al. | ............. | 455/412.2 |
| 2006/0010226 A1* | 1/2006 | Hurtta et al. | ................ | 709/217 |
| 2006/0095526 A1* | 5/2006 | Levergood et al. | .......... | 709/206 |
| 2006/0193345 A1* | 8/2006 | Matsuda et al. | ............. | 370/467 |
| 2006/0209867 A1* | 9/2006 | Schmidt et al. | ............. | 370/428 |
| 2006/0293068 A1* | 12/2006 | Svensson et al. | ............ | 455/466 |
| 2007/0050257 A1* | 3/2007 | Fine et al. | ...................... | 705/14 |
| 2007/0074017 A1* | 3/2007 | Schmidt et al. | ............. | 713/150 |
| 2010/0041423 A1* | 2/2010 | McNamara et al. | ......... | 455/466 |

OTHER PUBLICATIONS

3GPP, Technical Specification 23.140 V6.5.0 (Mar. 2004), Multimedia Messaging Service (MMS), Functional Description; Mar. 26, 2004; pp. 1-178.*

(Continued)

*Primary Examiner*—Asad M Nawaz
*Assistant Examiner*—Oleg Survillo
(74) *Attorney, Agent, or Firm*—Moazzam & Associates, LLC

(57) ABSTRACT

A method and system of mass multimedia messaging in a system having a service provider and a plurality of subscriber communication terminal types supported by the service provider, wherein at least some of the subscriber terminal types have differing messaging capabilities and differing message format requirements. The method includes adaptation and handling of a mass multimedia message, and mass multimedia message notification. The system may use a retrieval platform and a processing platform. The retrieval platform may pre-adapt the message into adapted content messages for the terminal types supported by the service provider, and generate unique message identifiers for each adapted content message. The processing platform may format message notifications for the subscriber terminal addresses based on each terminal's messaging capabilities, with each notification containing one of the unique message identifiers selected by reference to the subscriber terminal type.

19 Claims, 10 Drawing Sheets

OTHER PUBLICATIONS

Wi-fitechnology.com; Cingular Wireless First to Offer MMS Notification to Most Mobile Phones; Oct. 2003; 4 pages; retrieved from http://www.wi-fitechnology.com/displayarticle578.html on Aug. 28, 2008.*

Edwin Sandberg; 3GPP MMS Standards and Features; Apr. 2003; Ericsson; pp. 1-19; retrieved from http://www.cdg.org/news/events/cdmaseminar/2003_Tech_Forum/EricssonSandberg.pdf on Sep. 3, 2008.*

The Authoritative Dictionary of IEEE Standards Terms, 2000, Standards Information Network, IEEE Press, 7th Ed, p. 872.*

* cited by examiner

| MOBILE TELEPHONE NUMBER | DEVICE TYPE | MODEL NO. | MMS CAPABLE | WAP PUSH CAPABLE | SMS CAPABLE | ... |
|---|---|---|---|---|---|---|
| XXX-XXX-XXXX | ● | ● | YES | YES | YES | ... |
| XXX-XXX-XXXX | ● | ● | NO | YES | YES | ... |
| XXX-XXX-XXXX | ● | ● | NO | NO | | |
| | ● | ● | ● | | | |
| | ● | ● | ● | | | |
| ● | ● | ● | | | | |
| ● | ● | | | | | |
| ● | ● | | | | | |
| ● | | | | | | |

FIG. 2

| DEVICE TYPE | MODEL NO. | DISPLAY SIZE | OPERATING SYSTEM | AUDIO ENCODERS | VIDEO ENCODERS | ⋮ |
|---|---|---|---|---|---|---|
| DEFAULT | DEFAULT | • | • | • | • | |
| • | • | • | • | • | • | |
| • | • | • | • | • | | |
| • | • | • | • | | | |
| • | • | • | • | | | |
| • | • | • | | | | |
| • | • | • | | | | |

```
POST /PAP/ HTTP/1.1 Content-Type: multipart/related;
boundary=asdlfkjiurwghasf; type="application/xml" Authorization: Basic
Host: 36.99.128.183:9002
Content-Length: 653

--asdlfkjiurwghasf
Content-type: application/xml
<?xml.version="1.0"?>
<!DOCTYPE pap PUBLIC "-//WAPFORUM//DTD PAP 1.0//EN"
"http://www.wapforum.org/DTD/pap_1.0.dtd" >
<push-message>
 source-reference="cingular Promotion MMSC">
  <address address-
value="WAPPUSH=7035014000/TYPE=PLMN@ppg.cingular.com"/>
  <quality-of-service delivery-method="unconfirmed" network="GSM"
bearer="SMS"/>
</push-message>
</pap>

--asdlfkjiurwghasf
Content-type: text/vnd.wap.si

<?xml.version="1.0"?>
<!DOCTYPE si PUBLIC "-//WAPFORUM//DTD.SI.1.0//EN"
"http://www.wapforum.org/DTD/si.dtd">
<si>
 <indication href="
http://retrieval_platform.cingular.com:8080/Unique_message_id">
 You have received a new Promotional Message
 </indication>
</si>
--asdlfkjiurwghasf--
```

502 — Content-type: text/vnd.wap.si

MASS MULTIMEDIA MESSAGING

CROSS-REFERENCE TO RELATED APPLICATIONS

This application is a continuation-in-part of U.S. patent application Ser. No. 10/978,322, filed Nov. 1, 2004 now U.S. Pat. No. 7,609,686, which is entirely incorporated herein by reference.

BACKGROUND OF THE INVENTION

A. Field of Invention

This invention relates to mass multimedia messaging by a service provider. More particularly, the invention relates to a method and system for mass multimedia messaging, including adaptation and handling of a mass multimedia message, and mass multimedia message notification in a system having a service provider and a plurality of subscriber communication terminals supported by the service provider, wherein at least some of the subscriber communication terminals have different messaging capabilities and different message format requirements.

B. Description of Related Art

Both wireless and wireline telecommunications systems have evolved from voice only systems to systems having text and rich multimedia messaging capabilities. This has created opportunities for mass messaging, such as promotional and bulk messaging. Such mass messaging capabilities currently exist using Short Message Service (SMS) technology, allowing content providers to forward a single short text message and a list of subscriber addresses to a service provider for mass text messaging to all subscriber addresses on the list. Multimedia messaging, such as Multimedia Message Service (MMS) and Wireless Application Protocol (WAP) Push, expand messaging capabilities to include audio, image and video content, but there is no equivalent mass messaging service available for multimedia messages.

One reason that multimedia messages are currently handled individually is that there is a wide range of capabilities among various types of subscriber communication terminals. For instance, some communication terminals have only SMS capabilities. Other communication terminals are capable of receiving WAP Push messages, and then viewing multimedia content using a microbrowser application program contained in the communication terminal software. Still other communication terminals have MMS capabilities and are able to receive and show (or play) multimedia objects on the mobile terminal. However, format requirements, such as hardware screen sizes and audio, image and video file formats, vary even between multimedia capable terminals. Thus, presently, the multimedia messaging system must adapt the content of each message for the capabilities of the communication terminal to which it is directed (known as "adaptation-on-the-fly"). This individual message content adaptation is particularly inefficient in a mass multimedia messaging scenario, as many adapted messages will be mere duplicates of other messages already adapted for communication terminals having the same or very similar capabilities. This unnecessary duplication of adapted message utilizes processing resources and requires additional storage capacities of the messaging system. Thus, there is a need for a more efficient system and method for mass multimedia messaging that provides content adaptation without unnecessary duplication of the adapted messages.

Such a system and method will also require a new method of providing message notification to the subscriber communication terminals. Thus, there is also a need for a system and method for mass multimedia message notification to subscriber terminals.

Additionally, once a multimedia message is delivered to the service provider, the content provider may wish to replace the message or parameters associated with the message, such as a promotion expiration date or an updated subscriber address list. Currently, the content provider has only a limited ability to replace the message or certain parameters of the message, and content adaptation for the replaced message must be done "on-the-fly". Thus, there is yet a further need for a system and method for mass multimedia messaging that provides for message and message parameter replacement, with efficient content adaptation as discussed above.

Further, content providers desire the ability to track how many subscribers have retrieved a mass multimedia message. As individually handled messages, tracking delivery requires tracking each message individually. Service providers desire an easier way to track how many subscribers have retrieved a mass message. Thus, there is still further a need for a system and method for mass multimedia messaging that provides tracking of how many subscribers have retrieved a mass message without having to track the messages individually.

SUMMARY OF THE INVENTION

The system and method of the present invention meets these needs, and others, by providing adaptation and handling of a mass multimedia message, and mass multimedia message notification. Advantageously, the invention allows the service provider to save resources by pre-adapting and storing the multimedia message only once for each terminal type supported by the service provider. Also, the processing of the mass multimedia message no longer requires adaptation-on-the-fly, which speeds up message delivery.

Still further, the system and method of the invention provides a reporting interface that will periodically publish the results of a promotion. This interface will also allow a polling interface to request current results.

Additional functionality will allow the invention to receive periodic updates of the promotional message so subscribers can just refresh the message from their handsets. This same functionality will allow replacement of the message or message parameters, such as the subscriber list or the promotion expiration, prior to retrieval of the message.

Thus, generally, the invention is a method and system of mass multimedia messaging in a system including a service provider and a plurality of terminal types supported by the service provider, wherein at least some of the terminal types have differing messaging capabilities and differing message format requirements. The method includes the following steps: receiving a multimedia message and a list of subscriber terminal addresses from a content provider; adapting the multimedia message into adapted content messages for each supported terminal type using terminal format requirements information for the terminal types supported by the service provider; generating a unique message identifier for each adapted content message; and formatting message notifications for each subscriber terminal address based on subscriber terminal messaging capabilities information, each message notification including one of the unique message identifiers selected by reference to subscriber terminal type information. In one embodiment, the steps of adapting the multimedia message and generating unique message identifiers are performed on a retrieval platform, and the step of formatting message notifications is performed on a processing platform.

The subscriber terminal messaging capabilities information and subscriber terminal type information might be found in a subscriber information database in communication with the processing platform. The messaging capabilities information could include information as to whether each subscriber terminal is SMS capable, WAP Push capable, or MMS capable. In this event, the step of formatting each message notification may further include: determining if the subscriber terminal is capable of receiving MMS messages; if it is determined that the subscriber terminal is capable of receiving MMS messages, then formatting the message notification as a MMS WAP Push notification; if it is determined that the subscriber terminal is not capable of receiving MMS messages, then determining if the subscriber terminal is capable of receiving WAP Push messages; if it is determined that the subscriber terminal is capable of receiving WAP Push messages, then formatting the message notification as a WAP Push notification; and if it is determined that the subscriber terminal is not capable of receiving WAP Push messages, then formatting the message notification as an SMS message.

In another aspect, the system has a user agent profiles database and an adaptation engine, where the adaptation engine is in communication with the user agent profiles database and with the retrieval platform. In this scenario, the user agent profiles database relates supported terminal type information with terminal format requirements information. The adaptation engine can then perform the following steps: receiving the multimedia message from the retrieval platform; obtaining terminal format requirements information for terminal types supported by the service provider system from the user agent profiles database; adapting the multimedia message into adapted content messages for each supported terminal type using the terminal format requirements information; and returning the adapted content messages and corresponding terminal type identifiers to the retrieval platform.

Advantageously, the method may also include adapting the multimedia message into a default adapted content message for a default terminal type using default terminal format requirements information.

Still further, the method may also include the steps of: sending the formatted message notifications to the subscriber terminal addresses; receiving requests for the adapted content messages from subscriber terminals in response to sending the formatted message notifications, each request containing an address for the requesting subscriber terminal; and sending adapted content messages to the requesting subscriber terminal addresses.

To facilitate reporting and message replacement, the system may include a reporting platform in communication with the processing platform, the retrieval platform and the content provider. In this event, the reporting platform tracks how many subscribers have retrieved the multimedia message. The method may then include the steps of: generating a promotional identifier associated with the multimedia message; and returning the promotional identifier to the content provider. Then, an order containing the promotional identifier could be received from the content provider to replace or cancel the multimedia message or to replace or cancel at least one parameter associated with the multimedia message. Alternatively, for reporting purposes, the method may include: tallying retrieval information for the multimedia message in a report associated with the promotional identifier; and periodically publishing the report to the content provider, or receiving a request for the report from the content provider; and publishing the report to the content provider in response to the request for the report.

Another aspect of the invention is a method of providing mass multimedia message notification to subscriber terminals. This method includes the following steps: receiving a list of subscriber terminal addresses to which message notifications for a mass multimedia message are to be sent, and unique message identifiers for adapted content message versions of the mass multimedia message; obtaining subscriber terminal type information and subscriber terminal messaging capabilities information for each subscriber address; and formatting message notifications for each subscriber terminal address based on the subscriber terminal messaging capabilities information, each message notification including one of the unique message identifiers selected by reference to the subscriber terminal type information.

A further aspect of the invention is a method of mass multimedia message adaptation and handling. This method includes: receiving a multimedia message; adapting the multimedia message into adapted content messages for each supported terminal type using terminal format requirements information for the terminal types supported by the service provider; and generating a unique message identifier for each adapted content message.

The system aspect of the invention could be implemented on digital computing equipment. Further, the various method aspects of the invention may be found as executable instructions in computer software contained on a computer readable medium.

No limitations on the invention should be taken from the preceding summary, as it is merely intended to summarize the various aspects of the invention. The invention will be better understood by reference to the following detailed description and the appended drawings and claims.

BRIEF DESCRIPTION OF THE DRAWINGS

FIG. 2 is a diagram of the data structure of an exemplary subscriber information database, as might be used with the system of the invention.

FIG. 3 is a diagram of the data structure of an exemplary user agent profiles database, as might be used with the system of the invention.

FIG. 5 is a diagram of an exemplary WAP Push message notification, as might be used with an aspect of the invention.

DETAILED DESCRIPTION OF EXEMPLARY EMBODIMENTS

It should be noted that many of the principles of the invention described and claimed herein will apply equally to wireline and other telecommunication systems, as well as to the wireless system shown and described herein. Thus, the use of exemplary message delivery and retrieval system components described herein should not be construed as a limitation on either the spirit or the scope of the claimed invention.

Figure 1:
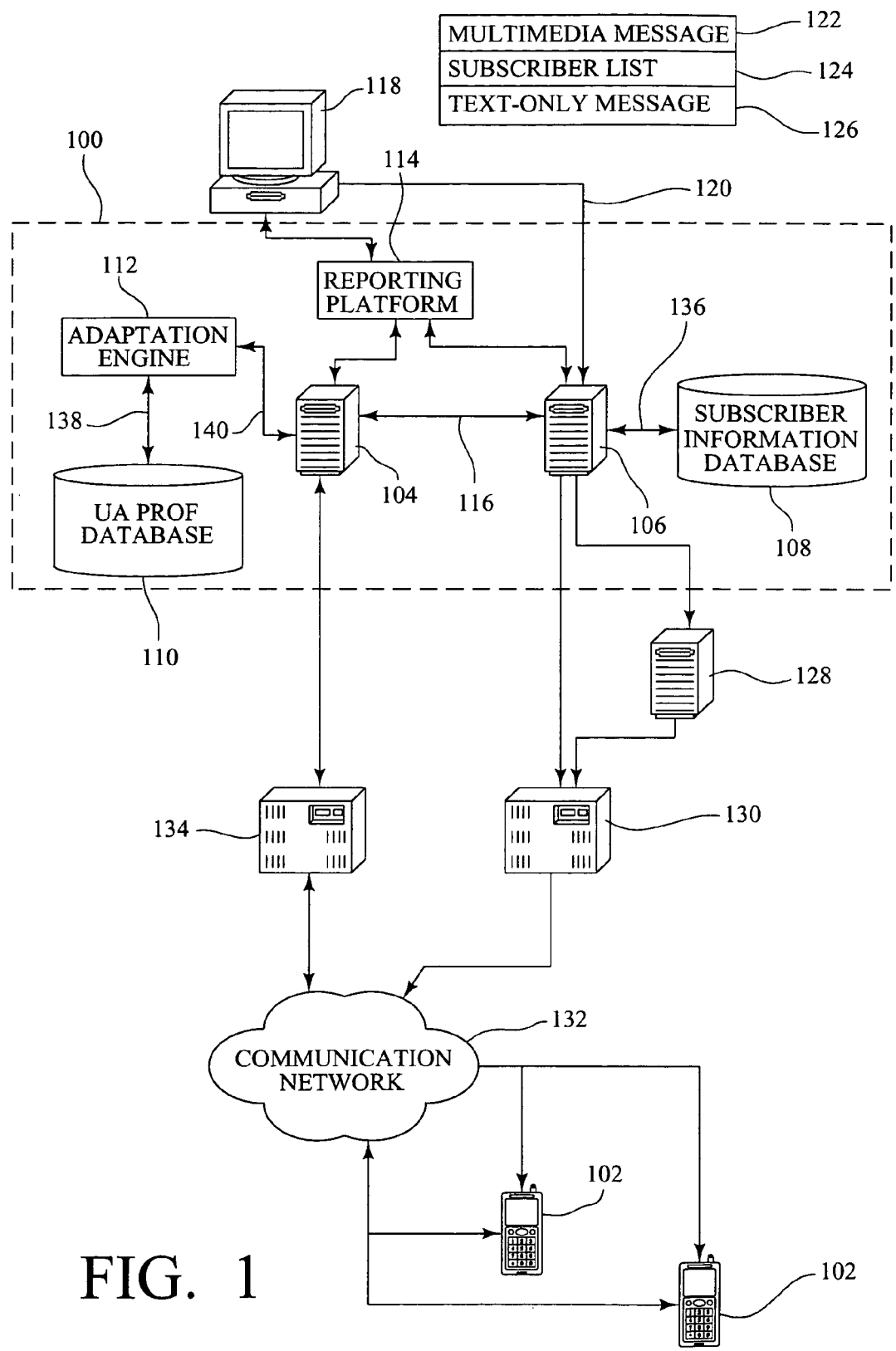
FIG. 1 is a diagram of an exemplary system for mass multimedia messaging by a service provider, wherein the service provider supports communication terminals having different format requirements and different messaging capabilities, according to the present invention.

FIG. 1. shows an exemplary system 100 for mass multimedia messaging by a service provider that supports subscriber communication terminals 102 having differing format requirements and differing messaging capabilities. The exemplary system 100 has a retrieval platform 104, a processing platform 106, a subscriber information database 108, a user agent profiles database 110, an adaptation engine 112, and a reporting platform 114.

While shown as stand-alone, server-type devices, the retrieval platform 104 and the processing platform 106 could also be combined with each other or with other functional platforms in a more centralized computing system architecture. In the stand-alone configuration shown, the retrieval platform 104 and the processing platform 106 are in communication with each other through a retrieval platform—processing platform communication link 116. This communication link 116 could use any functional two-way, server-to-server protocol to facilitate the flow of information between the retrieval platform and the processing platform. This configuration, as will be discussed, provides efficient use of the resources of each platform to provide an overall system that addresses the need for efficient and effective mass multimedia messaging.

Also shown is a representation of a content provider 118 in communication with the system 100 over a content provider—mass multimedia messaging system communication link 120. For convenience, this link 120 is shown between the content provider 118 and the processing platform 106. However, one of skill in the art will understand that the link could also be between the content provider 118 and the retrieval platform 104. This link 120 could be a secure HTTP-type connection, such as SSL, VPN or T1 frame relay connections.

In operation, the content provider 118 will send a multimedia message 122 and a list of subscriber terminal addresses 124, such as telephone numbers, to which the message is directed to the system 100. The message 122 and address list 124 "feed" could be delivered using an XML/SOAP (Extensible Markup Language/Simple Object Access Protocol) type protocol, such as an MM7 interface protocol. The multimedia message may be in a SMIL (Synchronized Multimedia Integration Language) format, or an equivalent multimedia format. Additionally, the content provider 118 may also include a text-only message 126 along with the feed, for delivery to terminals 102 that are only capable of receiving text messages.

Also shown are other components of a messaging system, including: a push proxy gateway (PPG) 128, an SMS Centre (SMSC) 130, a communication network 132, and a WAP Gateway 134. The SMSC 130 sends SMS messages through the communication network 132 to the subscriber communication terminals 102. The PPG 128 and the SMSC 130 cooperate to send SMS format message notifications through the communications network 132 to the subscriber communication terminals 102. Alternatively, the functionality of the PPG 128 could be performed by the processing platform 106, eliminating the need for the PPG 128 and allowing the processing platform 106 to send such notifications directly to the SMSC 130. Once the subscriber terminals 102 have received a message notification, the subscriber terminals 102 utilize the communication network 132 and the WAP Gateway 134 to retrieve the associated multimedia message from the system 100 utilizing an appropriate data bearer, such as GPRS (General Packet Radio Service) or EDGE (Enhanced Data for GSM Evolution).

FIG. 2 shows the structure of an exemplary subscriber information database provisioned with data relating subscriber terminal address information 202, such as subscriber mobile telephone numbers, with subscriber terminal type information 204 and subscriber terminal messaging capabilities information 206 for the corresponding subscriber terminals. The subscriber terminal type information 204 includes, for example, device type information 208 and model number information 210. The subscriber terminal messaging capabilities information 206 includes, for example, an indication of whether each terminal is: MMS Capable 212; WAP Push Capable 214; and SMS Capable 216.

Returning to FIG. 1, it is seen that the subscriber information database 108 is in communication with the processing platform 106 through a subscriber information database—processing platform communication link 136. This link 136 could be an LDAP (Lightweight Directory Access Protocol) or equivalent communication link. Alternatively, the subscriber information database 108 may be integrated with the processing platform 106 and communicate over a bus or equivalent data communication structure.

FIG. 3 shows the structure of an exemplary user agent profiles database. The exemplary user agent profiles database is provisioned with data relating supported terminal type information 308 with terminal format requirements information 306 for each terminal type supported by the service provider. The supported terminal type information 308 would include information, such as device types 310 and model numbers 312. The terminal format requirements information 306 would include information such as hardware display sizes 314, operating system software 316, audio encoders 318 supported by the device, and video encoders 320 supported by the device. Additionally, the exemplary user agent profiles database includes characteristics for a default or generic terminal 304.

Returning again to FIG. 1, it is seen that the user agent profiles database 110 is in communication with the adaptation engine 112 through a user agent profiles database—adaptation engine communication link 138. This link 138 could be an LDAP or equivalent communication link. Alternatively, the user agent profiles database may be integrated with the adaptation engine, communicating through a bus or equivalent data communication structure.

The adaptation engine 112 is a computing device that is operative to receive a multimedia message, obtain terminal format requirements information for the terminal types supported by the service provider from the user agent profiles database, and adapt the multimedia message into adapted content messages meeting the terminal format requirements for each supported terminal type. The adaptation engine 112 is in communication with the retrieval platform 104 through an adaptation engine—retrieval platform communication link 140. This link could use a client-server protocol such as SOAP/HTTP, or the equivalent. Alternatively, the adaptation engine could be integrated with the retrieval platform and communicate over a bus or equivalent data structure.

In operation, the processing platform 106 receives the mass multimedia message 122 and the list of subscribers addresses 124 from the content provider 118. The processing platform 106 then sends the multimedia message 122 to the retrieval platform 104. Optionally, the processing platform 106 could include a Mass Media Identifier with the multimedia message 122 in order to indicate that the multimedia message 122 should be handled as a mass message. Such an indication, however, could also be implicit in the sending of the multimedia message 122 to the retrieval platform 104.

The retrieval platform 104 receives the multimedia message 122, and sends the multimedia message 122 to the adaptation engine 112.

The adaptation engine 112 receives the multimedia message 122 from the retrieval platform 104. Then, the adaptation engine 112 obtains terminal format requirements information for the terminal types supported by the service provider system, plus the default terminal type, from the user agent profiles database 110. Using the terminal format requirements information, the adaptation engine 112 adapts the multimedia message 122 into adapted content messages for each supported terminal type, plus the default terminal type. For example, the multimedia message 122 will be adapted for different display sizes, and different audio and video file format requirements for different MMS capable terminals. Additionally, the multimedia message 122 will be adapted into multiple WML pages to allow WAP Push retrieval. The adaptation engine 112 then sends the adapted messages, along with corresponding terminal type information 308, back to the retrieval platform 104.

The retrieval platform 104 then generates a unique message identifier for each adapted content message, and returns the message identifiers to the processing platform 106. In the exemplary embodiment, each message identifier is from 10 to 32 characters in length, in order to allow a message notification containing the message identifier to have less than the 160 character limit for SMS messages. The message identifiers will be used in conjunction with the retrieval platform's DNS address to facilitate retrieval of the adapted content messages by the subscriber terminals 102. Thus, the retrieval platform 104 of the exemplary embodiment adapts the multimedia message 122 only once for each supported terminal type, and stores those adapted content messages for easy retrieval. This eliminates the unnecessary duplication and wasted use of resources of the adaptation-on-the-fly method.

Upon receipt of the unique message identifiers and the corresponding terminal type information from the retrieval platform 104, the processing platform 106 verifies each subscriber address and obtains subscriber terminal messaging capabilities information for each subscriber address from the subscriber information database 108. Additionally, the processing platform 106 will obtain terminal type information from the subscriber information database 108. The processing platform 106 then uses the terminal type information to select one of the unique message identifiers, and the subscriber terminal messaging capabilities information to format message notifications for each subscriber terminal address. For instance, if the messaging capabilities information indicates that the subscriber terminal is MMS capable, the processing platform 106 will format the message notification as an MMS WAP Push notification. If the messaging capabilities information indicates that the subscriber terminal is WAP Push capable, but not MMS capable, the processing platform 106 will format the message notification as a WAP Push notification. Each message notification will contain the appropriate message identifier for the terminal type corresponding to the subscriber address for that notification.

Figure 4:
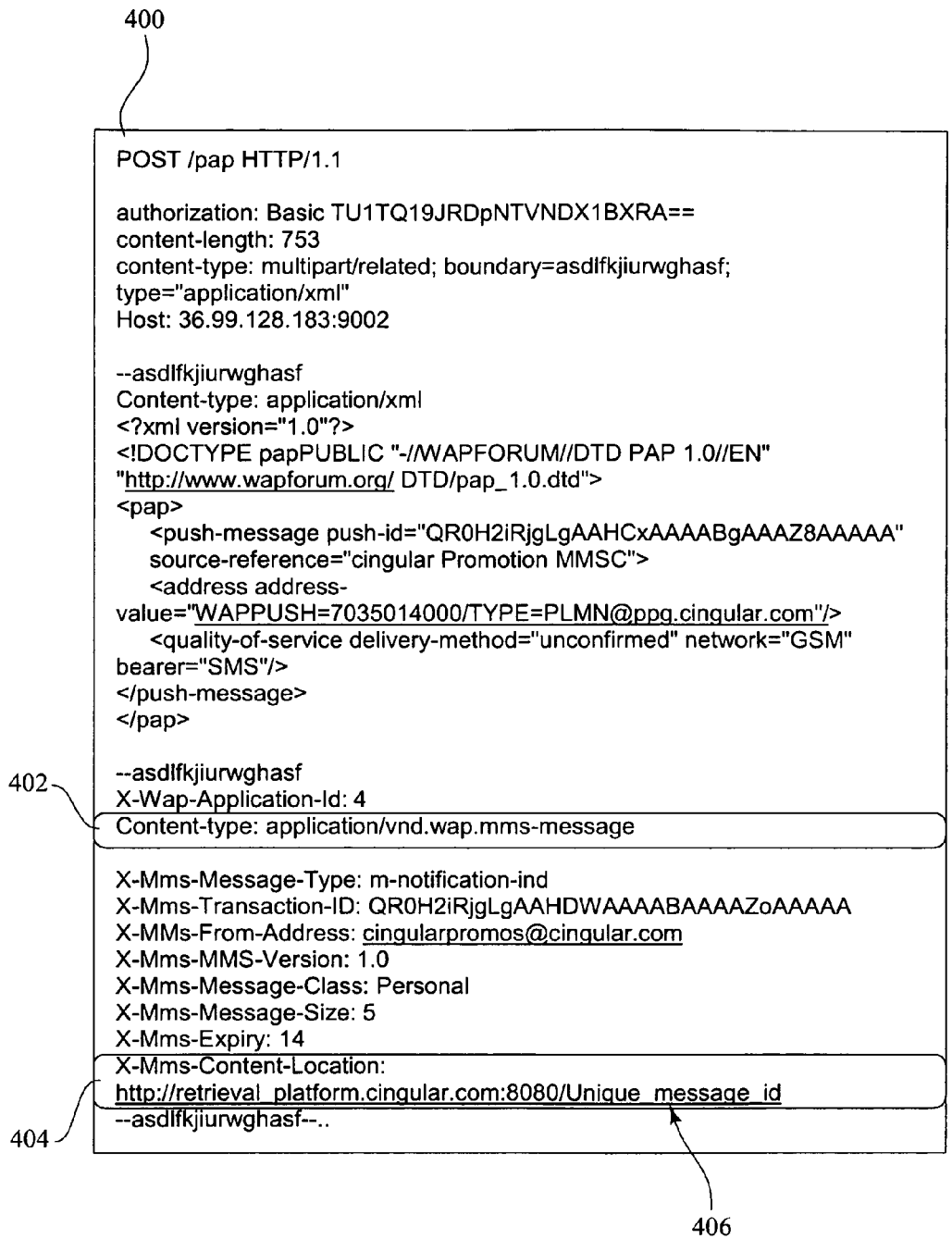
FIG. 4 is a diagram of an exemplary MMS WAP Push message notification, as might be used with an aspect of the invention.

FIG. 4 shows an exemplary MMS WAP Push message notification 400. Such a notification will contain an indication that it is a multimedia message notification 402, and will also contain a location address for the adapted content message 404 containing the retrieval platform's DNS address and the unique message identifier 406.

FIG. 5 shows an exemplary WAP Push message notification 500. Such a notification will contain an indication that it is a WAP Push message notification 502, and will contain a service indication reference for the WAP Push message 504, also containing the retrieval platform's DNS address and the unique message identifier 506.

If the messaging capabilities information indicates that the subscriber terminal is only SMS capable, the processing platform 106 can: (1) format the message notification as an actual SMS message containing the text-only message 126; or (2) format the message notification as an SMS message containing a URL for a web-version of the message that the user could retrieve with a web-enabled device. The text-only message 126 could either be: (1) provided by the content provider along with the multimedia message, as described earlier; or (2) stripped from the multimedia message 122 by removing the first 160 characters of the text of the message.

The processing platform 106 then sends the formatted message notifications to the subscriber terminal addresses using the push proxy gateway 128, the SMSC 130, and the communications network 132, as shown. Thus, the processing platform 106 of the exemplary embodiment provides mass multimedia message notification for subscriber terminals 102 having various messaging capabilities, efficiently handling this function.

Upon receipt of the message notifications, the multimedia capable subscriber terminals 102 then send requests through the communications network 132 and WAP Gateway 134, as shown, to retrieve an appropriate adapted content message from the retrieval platform 104. Each retrieval request contains the address for the requesting subscriber terminal.

Figure 6:
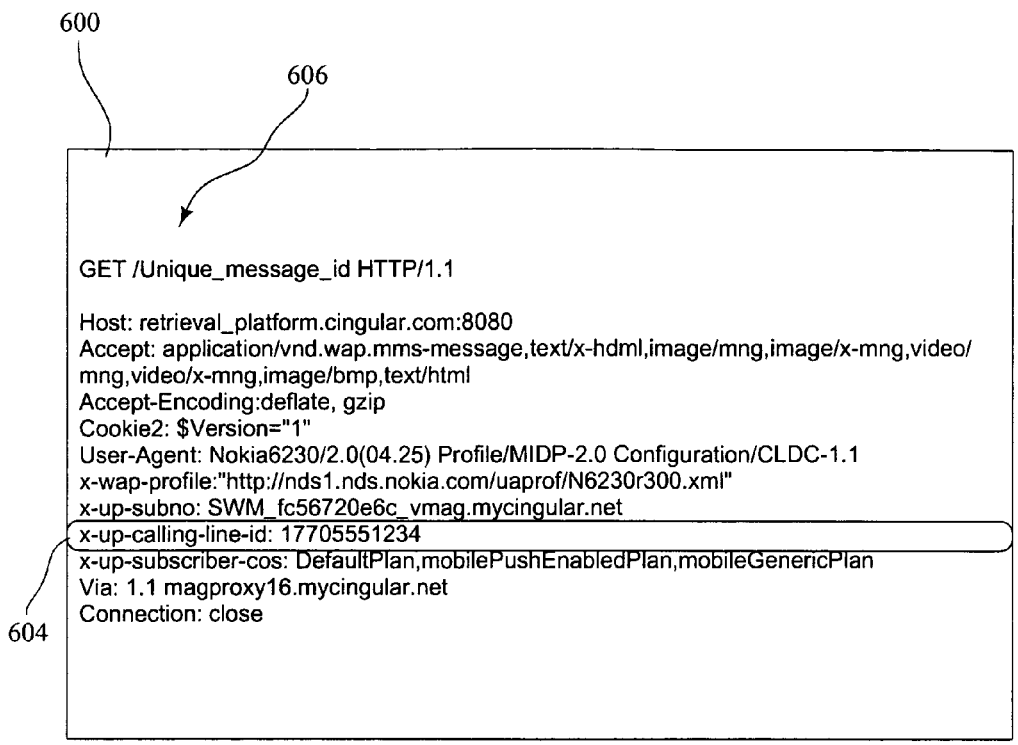
FIG. 6 is a diagram of an exemplary MMS Message Retrieval Request, as might be used with an aspect of the invention.

FIG. 6 shows an exemplary MMS retrieval request 600 utilizing a WSP/HTTP GET command. The MMS retrieval request 600 also contains the address 604, or phone number, for the requesting terminal, and the unique message identifier 606.

The retrieval platform 104 then receives the requests for the multimedia message from the subscriber terminals 102. Then the retrieval platform 104 sends the adapted content messages to the corresponding subscriber terminal addresses that initiated the requests, thus accomplishing mass multimedia messaging.

Figure 7:
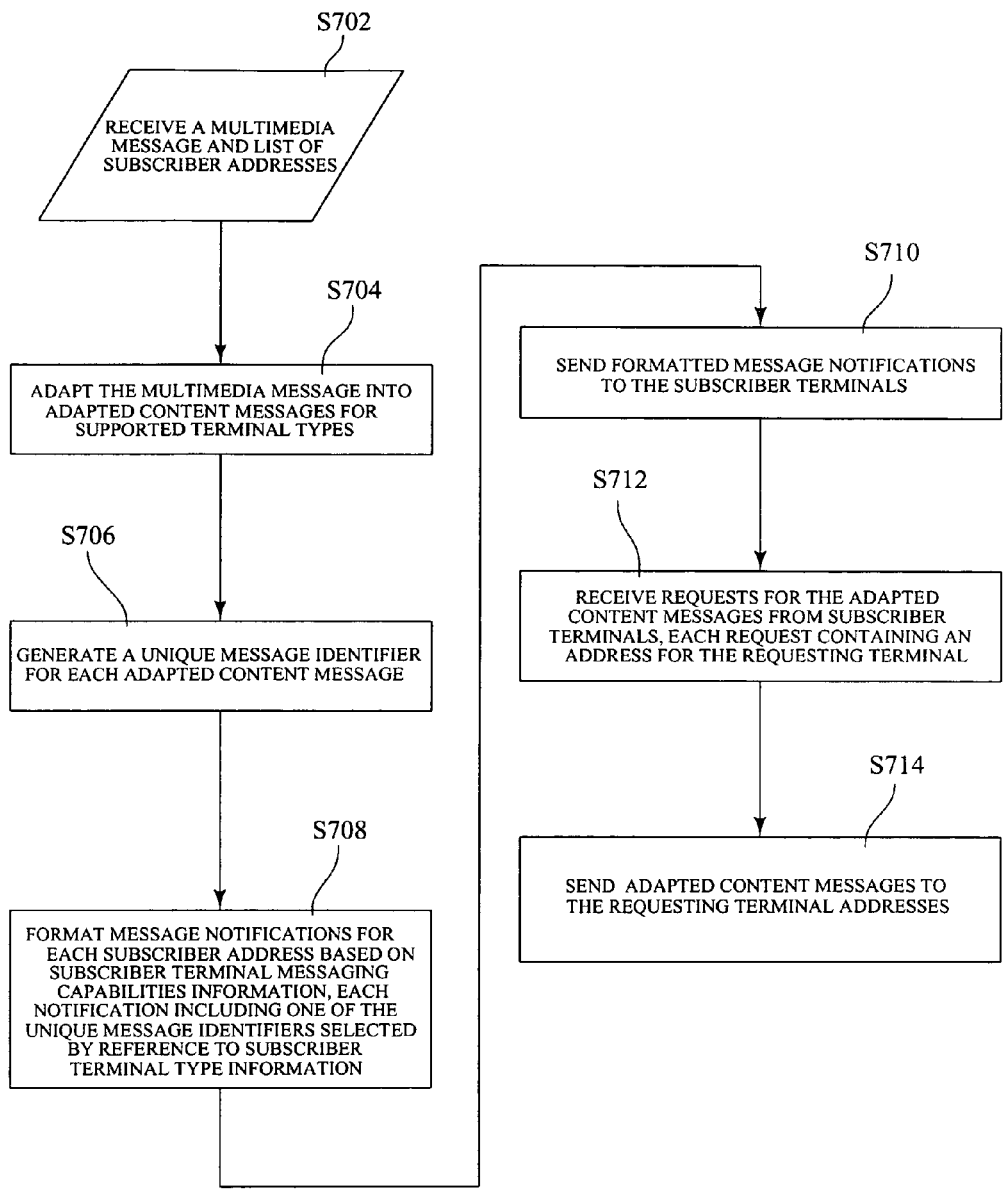
FIG. 7 is a flow diagram of an exemplary system level method according to the present invention.

FIG. 7 shows an exemplary method of mass multimedia messaging in a system including a service provider and a plurality of terminal types supported by the service provider, wherein at least some of the terminal types have different messaging capabilities and differing message format requirements. The exemplary method includes the steps of: S702 receiving a multimedia message and a list of subscriber terminal addresses; S704 adapting the multimedia message into adapted content messages for each supported terminal type using terminal format requirements information for the terminal types supported by the service provider; S706 generating a unique message identifier for each adapted content message; and S708 formatting message notifications for each subscriber terminal address based on subscriber terminal messaging capabilities information, with each notification including one of the unique message identifiers selected by reference to subscriber terminal type information. Additionally, the method may include the steps of: S710 sending the formatted message notifications to the subscriber terminal addresses; S712 receiving requests for the adapted content messages from subscriber terminals in response to sending the formatted message notifications to the subscriber terminal addresses, with each request containing an address for the requesting subscriber terminal; and S714 sending the adapted content messages to the corresponding subscriber terminal addresses associated with each request.

Figure 8:
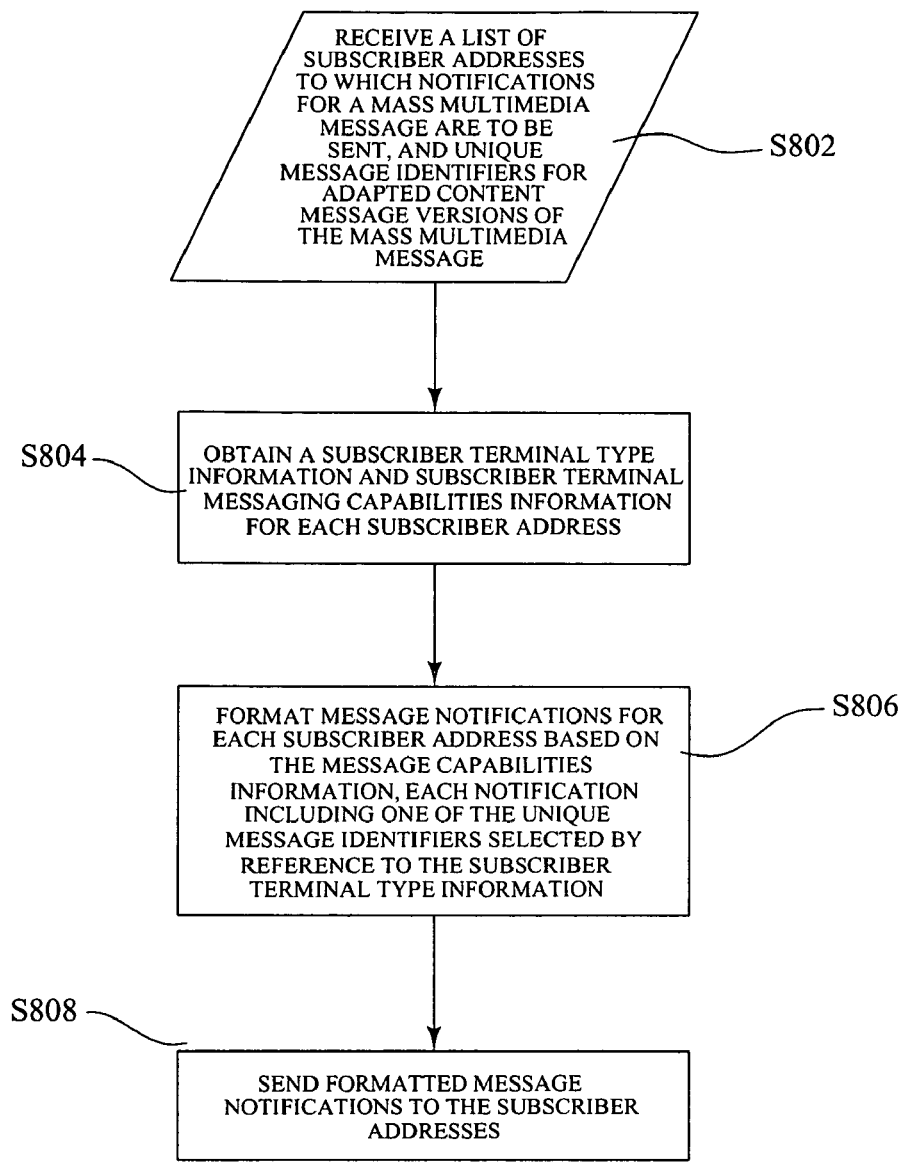
FIG. 8 is a flow diagram of an exemplary device level method for a processing platform according to an aspect of the present invention.

FIG. 8 shows an exemplary method of providing mass multimedia message notification to subscriber terminals wherein at least some of the terminals have differing messaging capabilities. The method includes the steps of: S802 receiving a list of subscriber terminal addresses to which message notifications for a mass multimedia message are to be sent, and unique message identifiers for adapted content message versions of the mass multimedia message; S804 obtaining subscriber terminal type information and subscriber terminal messaging capabilities information for each subscriber address; and S806 formatting message notifications for each subscriber terminal address based on the subscriber terminal messaging capabilities information, each message notification including one of the unique message identifiers selected by reference to the subscriber terminal type information. When the method uses a subscriber information database 108, as described above, the step of S804 obtaining subscriber terminal messaging capabilities information could include the steps of: requesting the subscriber terminal messaging capabilities information for each subscriber terminal from the subscriber information database 108, and receiving the subscriber terminal messaging capabilities information for each subscriber terminal from the subscriber information database 108. Still further, the method could include the step of S808 sending the formatted message notifications to the subscriber terminal addresses.

Figure 9:
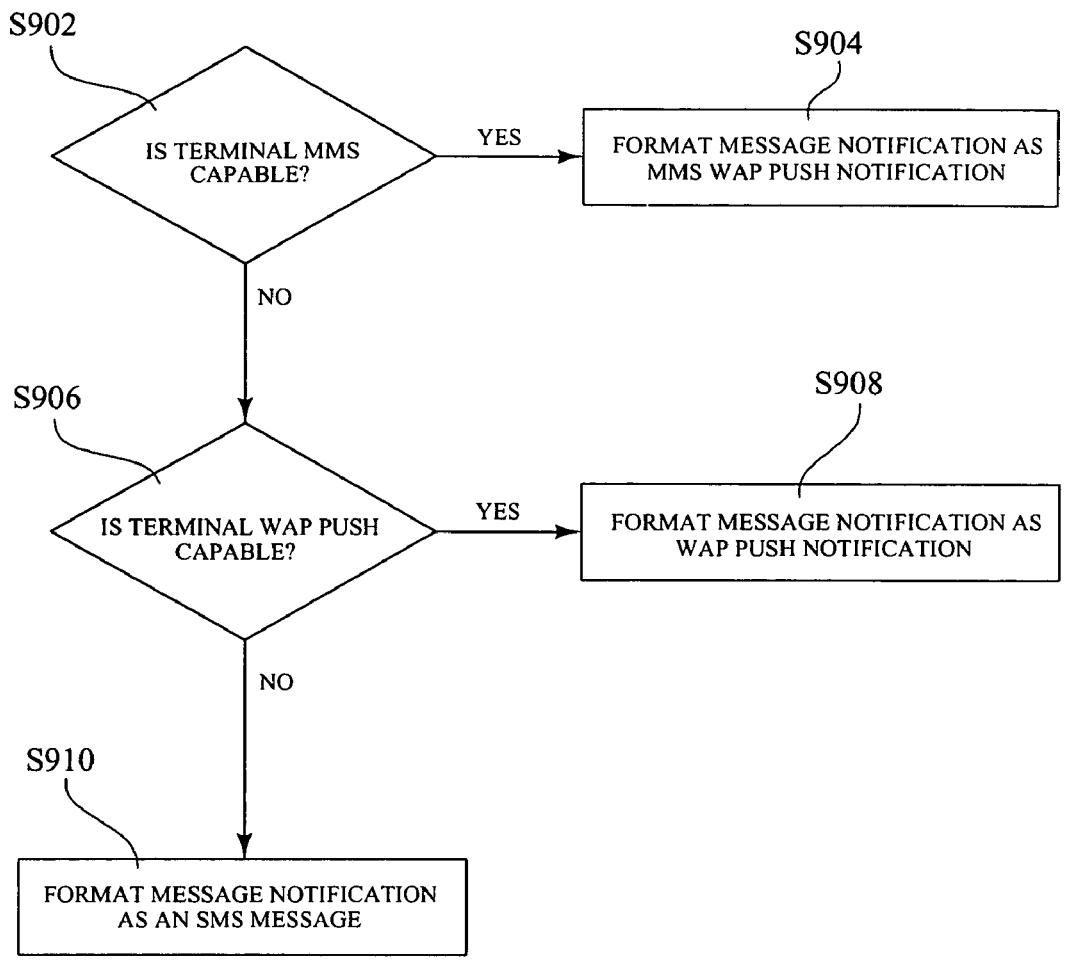
FIG. 9 is a flow diagram of a step of formatting message notifications of the method shown in FIG. 9.

FIG. 9 shows a situation where subscriber mobile terminals are SMS, WAP Push, or MMS capable. Then, the step of formatting message notifications for each subscriber address could also include the steps of: S902 determining if the terminal is MMS capable; if yes, then S904 formatting the message notification as an MMS WAP Push notification; in no, then S906 determining if the terminal is WAP Push capable; if yes, then S908 formatting the message notification as a WAP Push notification; if no, then S910 formatting the message notifications as an SMS messages.

Figure 10:
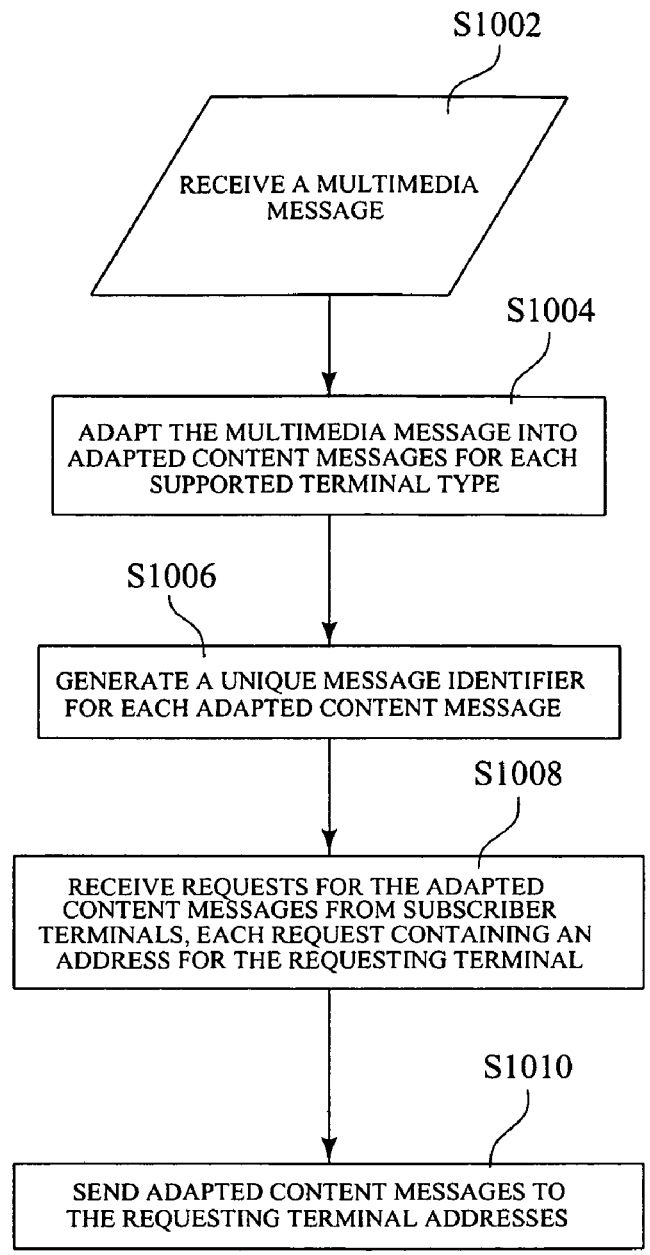
FIG. 10 is a flow diagram of an exemplary device level method for a retrieval platform according to an aspect of the present invention.

FIG. 10 shows an exemplary method of mass multimedia message adaptation and handling in a system including a service provider and a plurality of terminal types supported by the service provider, wherein at least some of said terminal types have differing message format requirements. The method includes the steps of: S1002 receiving a multimedia message; S1004 adapting said multimedia message into adapted content messages for each supported terminal type using terminal format requirements information; and S1006 generating a unique message identifier for each adapted content message. When the method uses a user agent profiles database 110, as described above, the step of S1006 adapting the multimedia message into adapted content messages could include the step of obtaining the terminal format requirements information from the user agent profiles database 110.

The method could still further include steps directed at delivery of adapted content message to the subscriber terminals 102, including: S1008 receiving requests for said adapted content messages from subscriber terminals 102, each request containing the address for the requesting subscriber terminal; and S1010 sending said selected adapted messages to the requesting subscriber terminal addresses.

Returning now to FIG. 1, the reporting platform 114 is in communication with the processing platform 106, the retrieval platform 104 and the content provider 118. The reporting platform 114 provides a reporting interface for tracking how many subscribers have retrieved adapted content message versions of the multimedia message 122. In operation, the exemplary mass multimedia messaging system 100 generates a promotional identifier associated with the multimedia message 122. The system 100 then returns the promotional identifier to the content provider 118 following receipt of the multimedia message 122. Each time an adapted content message for a particular mass multimedia message 122 is retrieved by a subscriber terminal 102, the retrieval platform 104 communicates the retrieval information to the reporting platform 114, which tallies the retrieval information in a report associated with the promotional identifier. Periodically, the reporting platform 104 publishes the report to the content provider 118. Also, the content provider 118 can access the report containing the retrieval information using the promotional identifier. The promotional identifier can be identical to the unique message identifier, or it can be another unique identifier.

Additionally, the content provider 118 can use the promotional identifier to issue an order to the mass multimedia messaging system 100 to replace/update or cancel the message 122 associated with that promotional identifier. Further, the content provider 118 can use the promotional identifier to replace or cancel only specific parameters associated with the message, such as the list of subscriber terminal addresses to which the message is directed, or the expiration date of the promotion. Any replacement message or message parameters could then be pre-adapted for the supported terminal types, as described earlier.

The system, including the described elements thereof, and the various database elements could be implemented on digital computing equipment, or the equivalent, through the use of computer programs, or the equivalent. Additionally, the various method aspects of the invention may also be found as executable instructions contained on a computer readable medium.

Thus, the invention provides a method and system for mass multimedia messaging, including adaptation and handling of a mass multimedia message, and mass multimedia message notification in a system having a service provider and a plurality of subscriber communication terminals supported by the service provider, wherein at least some of the subscriber communication terminals have different messaging capabilities and different message format requirements. One of ordinary skill in the art will recognize that additional configurations are possible without departing from the teachings of the invention or the scope of the claims which follow. This detailed description, and particularly the specific details of the exemplary embodiments disclosed, is given primarily for clearness of understanding and no unnecessary limitations are to be understood therefrom, for modifications will become obvious to those skilled in the art upon reading this disclosure and may be made without departing from the spirit or scope of the claimed invention.

What is claimed is:

1. A method of providing mass multimedia message notification in a system including a service provider and a plurality of terminal types supported by the service provider, wherein at least some of said terminal types have differing messaging capabilities, said method comprising:

receiving from a content provider a list of subscriber terminal addresses to which message notifications for a mass multimedia message are to be sent, and unique message identifiers for a plurality of adapted content messages of the mass multimedia message;

obtaining subscriber terminal type information and subscriber terminal messaging capabilities information for each subscriber address, the terminal type information including at least a hardware display size, an operating system version, and audio and video encoders supported by each terminal;

formatting message notifications for each subscriber terminal address based on said subscriber terminal messaging capabilities information, each message notification including one of said unique message identifiers selected by reference to said subscriber terminal type information, wherein the unique message identifier is used in conjunction with a DNS address of a retrieval server platform to facilitate retrieval of the plurality of adapted content messages by the subscriber terminals;

sending said formatted message notifications to said subscriber terminal addresses;

receiving, at the retrieval server platform, requests for each of the plurality of adapted content messages from subscriber terminals in response to sending said formatted message notifications, each request containing an address for the requesting subscriber terminal, unique message identifier, and the DNS address;

sending said each adapted content message to the requesting subscriber terminal addresses;

generating a promotional identifier associated with said mass multimedia message;

returning said promotional identifier to said content provider through said retrieval server platform;

communicating retrieval information to a reporting server platform each time an adapted content message is retrieved by a subscriber terminal;

at said reporting server platform, tallying retrieval information for each retrieved adapted content message from said plurality of adapted content messages of the multimedia message in a report associated with said promotional identifier; and periodically publishing said report to said content provider through said reporting server platform, the report including the tallied retrieval information for the plurality of adapted content messages retrieved by said each subscriber terminal.

2. The method of claim 1, wherein said step of obtaining subscriber terminal type information and subscriber terminal messaging capabilities information includes:

requesting said subscriber terminal type information and subscriber terminal messaging capabilities information for each subscriber terminal from a subscriber information database using said subscriber terminal addresses; and receiving said subscriber terminal type information and subscriber terminal messaging capabilities information for each subscriber terminal from said subscriber information database.

3. The method of claim 2, wherein said subscriber terminal messaging capabilities information includes information as to whether each subscriber terminal is SMS capable, WAP Push capable, or MMS capable, wherein said step of formatting message notifications further comprises:

determining if the subscriber terminal is capable of receiving MMS messages;

if it is determined that the subscriber terminal is capable of receiving MMS messages, then formatting the message notification as a MMS WAP Push notification;

if it is determined that the subscriber terminal is not capable of receiving MMS messages, then determining if the subscriber terminal is capable of receiving WAP Push messages;

if it is determined that the subscriber terminal is capable of receiving WAP Push messages, then formatting the message notification as a WAP Push notification; and if it is determined that the subscriber terminal is not capable of receiving WAP Push messages, then formatting the message notification as an SMS message.

4. A method of mass multimedia message adaptation and handling in a system including a service provider and a plurality of terminal types supported by the service provider, wherein at least some of said terminal types have differing message format requirements, said method comprising:

receiving a multimedia message from a content provider;

adapting said multimedia message into a plurality of adapted content messages, wherein each of the plurality of adapted content messages corresponds to a different supported terminal type, each of the supported terminal types being determined using terminal format requirements information, the terminal format requirements including at least a hardware display size, an operating system version, and audio and video encoders supported by each terminal;

generating a unique message identifier for each of said plurality of adapted content messages of said multimedia message, wherein the unique message identifier is used in conjunction with a DNS address of a retrieval server platform to facilitate retrieval of the plurality of adapted content messages by a plurality of subscriber terminals;

sending message notifications to subscriber terminal addresses;

receiving, at the retrieval server platform, requests for said each of the plurality of adapted content messages from subscriber terminals in response to sending said message notifications, each request containing an address for the requesting subscriber terminal, unique message identifier, and the DNS address;

sending said each adapted content message to the requesting subscriber terminal addresses;

generating a promotional identifier associated with said multimedia message;

returning said promotional identifier to said content provider through said retrieval server platform;

communicating retrieval information to a reporting server platform each time an adapted content message is retrieved by a subscriber terminal;

at said reporting server platform, tallying retrieval information for each retrieved adapted content message from said plurality of adapted content messages of the multimedia message in a report associated with said promotional identifier; and periodically publishing said report to said content provider through said reporting server platform, the report including the tallied retrieval information for the plurality of adapted content messages retrieved by each terminal of said each terminal type.

5. The method of claim 4, wherein said terminal format requirements information is stored in a user agent profiles database, further including obtaining said terminal format requirements information for terminal types supported by the system from said user agent profiles database.

6. The method of claim 4, further including adapting said multimedia message into a default adapted content message for a default terminal type using default terminal format requirements information, and generating a unique message identifier for said default adapted content message.

7. The method of claim 4, further including receiving an order to replace or cancel said multimedia message or to replace or cancel at least one parameter associated with said multimedia message, said order containing said promotional identifier.

8. The method of claim 4, further including:
receiving a request for said report; and
publishing said report in response to said request for said report.

9. A method of mass multimedia messaging in a system including a service provider and a plurality of terminal types supported by the service provider, wherein at least some of said terminal types have differing messaging capabilities and differing message format requirements, said method comprising:
receiving a multimedia message and a list of subscriber terminal addresses from a content provider;
adapting said multimedia message into a plurality of adapted content messages, wherein each of the plurality of adapted content messages corresponds to a different supported terminal type, each of the supported terminal types being determined using terminal format requirements information for the terminal types supported by the service provider, the terminal format requirements including at least a hardware display size, an operating system version, and audio and video encoders supported by each terminal;
generating a unique message identifier for each of the plurality of adapted content messages of said multimedia message, wherein the unique message identifier is used in conjunction with a DNS address of a retrieval server platform to facilitate retrieval of the plurality of adapted content messages by the subscriber terminals;
formatting message notifications for each subscriber terminal address based on subscriber terminal messaging capabilities information, each message notification including one of said unique message identifiers, selected by reference to subscriber terminal type information, and the DNS address of the retrieval server platform;
sending said formatted message notifications to said subscriber terminal addresses;
receiving, at the retrieval server platform, requests for said each of the plurality of adapted content messages from subscriber terminals in response to sending said formatted message notifications, each request containing an address for the requesting subscriber terminal, unique message identifier, and the DNS address;
sending said each adapted content message to the requesting subscriber terminal addresses;
generating a promotional identifier associated with said multimedia message;
returning said promotional identifier to said content provider through said retrieval server platform;
communicating retrieval information to a reporting server platform each time an adapted content message is retrieved by a subscriber terminal;
at said reporting server platform, tallying retrieval information for each retrieved adapted content message from said plurality of adapted content messages of the multimedia message in a report associated with said promotional identifier; and
periodically publishing said report to said content provider through said reporting server platform, the report including the tallied retrieval information for the plurality of adapted content messages retrieved by said each subscriber terminal.

10. The method of claim 9, wherein said subscriber terminal messaging capabilities information includes information as to whether each subscriber terminal is SMS capable, WAP Push capable, or MMS capable, wherein said step of formatting each message notification further comprises:
determining if the subscriber terminal is capable of receiving MMS messages;
if it is determined that the subscriber terminal is capable of receiving MMS messages, then formatting the message notification as a MMS WAP Push notification;
if it is determined that the subscriber terminal is not capable of receiving MMS messages, then determining if the subscriber terminal is capable of receiving WAP Push messages;
if it is determined that the subscriber terminal is capable of receiving WAP Push messages, then formatting the message notification as a WAP Push notification; and
if it is determined that the subscriber terminal is not capable of receiving WAP Push messages, then formatting the message notification as an SMS message.

11. The method of claim 9, further including adapting said multimedia message into a default adapted content message for a default terminal type using default terminal format requirements information.

12. The method of claim 9, further including receiving an order from said content provider to replace or cancel said multimedia message or to replace or cancel at least one parameter associated with said multimedia message, said order containing said promotional identifier.

13. The method of claim 9, further including:
receiving a request for said report from said content provider; and
publishing said report to said content provider in response to said request for said report.

14. A system for mass multimedia messaging by a service provider, wherein the service provider supports communication terminal types having differing messaging capabilities and differing message format requirements, and wherein a content provider provides a multimedia message and a list of subscriber terminal addresses to which the service provider is to deliver the message, said system comprising:
a retrieval server computer platform including at least one central processing unit (CPU), the retrieval server computer platform that performs:
adapting said multimedia message into a plurality of adapted content messages, wherein each of the plurality of adapted content messages corresponds to a different supported terminal type, each of the supported terminal types being based on terminal format requirements information for the terminal types supported by said service provider, the terminal format requirements including at least a hardware display size, an operating system version, and audio and video encoders supported by each terminal;
generating a unique message identifier for each of the plurality of adapted content messages of said multimedia message, wherein the unique message identifier is used in conjunction with a DNS address of the retrieval server computer platform to facilitate retrieval of the plurality of adapted content messages by the subscriber terminals;
generating a promotional identifier associated with said multimedia message;

returning said promotional identifier to said content provider;

a processing server computer platform including at least one central processing unit (CPU) and in communication with said retrieval server computer platform, said processing platform that performs:

formatting message notifications for each subscriber terminal address based on subscriber terminal messaging capabilities information, each message notification including one of said unique message identifiers selected by reference to subscriber terminal type information and the DNS address of the retrieval server platform; and sending said formatted message notifications to said subscriber terminal addresses:

the retrieval server computer platform further performing:

receiving requests for each of the plurality of adapted content messages from subscriber terminals in response to sending said formatted message notifications, each request containing an address for the requesting subscriber terminal, unique message identifier, and the DNS address; and sending said each adapted content message to the requesting subscriber terminal addresses; and a reporting server platform including at least one CPU that performs:

tallying retrieval information for each retrieved adapted content message from said plurality of adapted content messages of the multimedia message in a report associated with said promotional identifier, wherein retrieval information is communicated from the retrieval server computer platform each time an adapted content message is retrieved by a subscriber terminal; and periodically publishing said report to said content provider, the report including the tallied retrieval information for the plurality of adapted content messages retrieved by said each subscriber terminal.

15. The system of claim 14, further having a user agent profiles database relating supported terminal type information with terminal format requirements information, and an adaptation engine computing device for adapting multimedia messages for supported terminal types, said adaptation engine computing device in communication with said user agent profiles database and said retrieval server computer platform, said adaptation engine computing device for:

receiving said multimedia message from said retrieval server platform;

obtaining terminal format requirements information for terminal types supported by said service provider from said user agent profiles database;

adapting said multimedia message into a plurality of adapted content messages corresponding to each supported terminal type using said terminal format requirements information; and returning said plurality of adapted content messages and corresponding terminal type identifiers to said retrieval server platform.

16. The system of claim 14, further having a subscriber information database relating subscriber terminal address information with subscriber terminal type information and subscriber terminal messaging capabilities information, said subscriber information database being in communication with said processing server computer platform, such that said processing server computer platform is able to obtain said subscriber terminal type information and said subscriber terminal messaging capabilities information from said subscriber information database.

17. A non-transitory computer readable medium having computer executable instructions for performing a method of mass multimedia messaging in a system including a service provider and a plurality of terminal types supported by the service provider, wherein at least some of said terminal types have differing messaging capabilities and differing message format requirements, where said method comprises:

receiving a multimedia message and a list of subscriber terminal addresses from a content provider;

adapting said multimedia message into a plurality of adapted content messages, wherein each of the plurality of adapted content messages corresponds to a different supported terminal type, each of the supported terminal types being determined using terminal format requirements information for the terminal types supported by the service provider, the terminal format requirements including at least a hardware display size, an operating system version, and audio and video encoders supported by each terminal;

generating a unique message identifier for each of the plurality of adapted content messages, wherein the unique message identifier is used in conjunction with a DNS address of a retrieval server platform to facilitate retrieval of the plurality of adapted content messages by the subscriber terminals;

formatting message notifications for each subscriber terminal address based on subscriber terminal messaging capabilities information, each message notification including one of said unique message identifiers, selected by reference to subscriber terminal type information, and the DNS address of the retrieval server platform;

sending said formatted message notifications to said subscriber terminal addresses;

receiving, at the retrieval server platform, requests for said each of the plurality of adapted content messages from subscriber terminals in response to sending said formatted message notifications, each request containing an address for the requesting subscriber terminal, unique message identifier, and the DNS address;

sending said each adapted content message to the requesting subscriber terminal addresses;

generating a promotional identifier associated with said multimedia message;

returning said promotional identifier to said content provider through said retrieval server platform;

communicating retrieval information to a reporting server platform each time an adapted content message is retrieved by a subscriber terminal;

at said reporting server platform, tallying retrieval information for each received adapted content message from said plurality of adapted content messages in a report associated with said promotional identifier; and periodically publishing said report to said content provider through said reporting server platform, the report including the tallied retrieval information for the plurality of adapted content messages.

18. A non-transitory computer readable medium having executable instructions for performing a method of providing mass multimedia message notification in a system including a service provider and a plurality of terminal types supported by the service provider, wherein at least some of said terminal types have differing messaging capabilities, where said method comprises:

receiving from a content provider a list of subscriber terminal addresses to which message notifications for a mass multimedia message are to be sent, and unique message identifiers for a plurality of adapted content messages of the mass multimedia message;

obtaining subscriber terminal type information and subscriber terminal messaging capabilities information for each subscriber address, the terminal type information including at least a hardware display size, an operating system version, and audio and video encoders supported by each terminal;

formatting message notifications for each subscriber terminal address based on said subscriber terminal messaging capabilities information, each message notification including one of said unique message identifiers selected by reference to said subscriber terminal type information, wherein the unique message identifier is used in conjunction with a DNS address of a retrieval server platform to facilitate retrieval of the plurality of adapted content messages by the subscriber terminals;

sending said formatted message notifications to said subscriber terminal addresses;

receiving, at the retrieval server platform, requests for each of the plurality of adapted content messages from subscriber terminals in response to sending said formatted message notifications, each request containing an address for the requesting subscriber terminal, unique message identifier, and the DNS address;

sending said each adapted content message to the requesting subscriber terminal addresses;

generating a promotional identifier associated with said mass multimedia message;

returning said promotional identifier to said content provider through said retrieval server platform;

communicating retrieval information to a reporting server platform each time an adapted content message is retrieved by a subscriber terminal;

at said reporting server platform, tallying retrieval information for each received adapted content message from said plurality of adapted content messages in a report associated with said promotional identifier; and periodically publishing said report to said content provider through said reporting server platform, the report including the tallied retrieval information for the plurality of adapted content messages.

19. A non-transitory computer readable medium having computer executable instructions for performing a method of mass multimedia message adaptation and handling in a system including a service provider and a plurality of terminal types supported by the service provider, wherein at least some of said terminal types have differing message format requirements, where said method comprises:

receiving a multimedia message from a content provider;

adapting said multimedia message into a plurality of adapted content messages, wherein each of the plurality of adapted content messages corresponds to a different supported terminal type, each of the supported terminal types being determined using terminal format requirements information for the terminal types supported by the service provider, the terminal format requirements including at least a hardware display size, an operating system version, and audio and video encoders supported by each terminal;

generating a unique message identifier for each of said plurality of adapted content messages of said multimedia message, wherein the unique message identifier is used in conjunction with a DNS address of a retrieval server platform to facilitate retrieval of the plurality of adapted content messages by a plurality of subscriber terminals;

sending message notifications to subscriber terminal addresses;

receiving, at the retrieval server platform, requests for said each of the plurality of adapted content messages from subscriber terminals in response to sending said message notifications, each request containing an address for the requesting subscriber terminal, unique message identifier, and the DNS address;

sending said each adapted content message to the requesting subscriber terminal addresses;

generating a promotional identifier associated with said multimedia message;

returning said promotional identifier to said content provider through said retrieval server platform;

communicating retrieval information to a reporting server platform each time an adapted content message is retrieved by a subscriber terminal;

at said reporting server platform, tallying retrieval information for each received adapted content message from said plurality of adapted content messages in a report associated with said promotional identifier; and periodically publishing said report to said content provider through said reporting server platform, the report including the tallied retrieval information for the plurality of adapted content messages.

\* \* \* \* \*